Patented July 14, 1942

2,289,349

UNITED STATES PATENT OFFICE 2,289,349

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application August 30, 1940,
Serial No. 354,840

9 Claims. (Cl. 260—205)

This invention relates to new azo dye compounds and their application to the art of coloring.

We have discovered that the azo compounds having the general formula:

$$A-N=N-B$$

wherein A represents the residue of a member selected from the group consisting of an aryl nucleus of the benzene series, an aryl nucleus of the naphthalene series, a benzothiazole nucleus and a benzoxazole nucleus, B represents the residue of a benzene nucleus having but one benzene ring and containing a

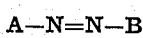 group, wherein R and $R_1$ each represents a member selected from the group consisting of hydrogen, an alkyl group, an allyl group, a cycloalkyl group, a phenyl group, and a furyl group and wherein

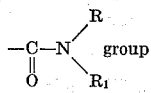

together may be morpholine, in ortho or meta position to the azo bond and a

 group, wherein $R_2$ and $R_3$ each represents a member selected from the group consisting of an alkyl group, an allyl group, a cycloalkyl group, a phenyl group and a furyl group and $R_2$ may be in addition hydrogen in para position to the azo bond, constitute a valuable class of dye compounds.

While our invention relates broadly to the dye compounds having the above formula, it relates more particularly to those compounds having the general formula:

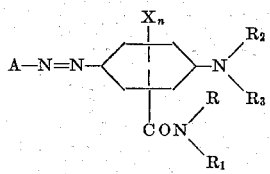

wherein A represents the residue of a member selected from the group consisting of an aryl nucleus of the benzene series, an aryl nucleus of the naphthalene series, a benzothiazole nucleus and a benzoxazole nucleus, R and $R_1$ each represents a member selected from the group consisting of hydrogen, an alkyl group, an allyl group, a cycloalkyl group, a phenyl group, and a furyl group and wherein

together may be morpholine, $R_2$ and $R_3$ each represents a member selected from the group consisting of an alkyl group, an allyl group, a cycloalkyl group, a phenyl group and a furyl group, and $R_2$ may be in addition hydrogen, X represents a member selected from the group consisting of hydrogen, a halogen atom, an alkoxy group, an alkyl group and an amino group and n represents 1 or 2. Depending upon their structure, the azo compounds of our invention possess application for the coloration of organic derivatives of cellulose, silk and wool. Coloration can be effected by dyeing, printing, stenciling or like methods.

Compounds of the general formula:

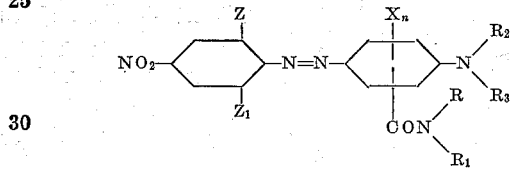

wherein Z and $Z_1$ each represents a member selected from the group consisting of hydrogen, a halogen atom, a nitro, an alkylsulfone, a sulfonamide, a hydroxy, an alkoxy, an alkyl, a cyano, an alkylketo, and a —COOY group, wherein Y represents a member selected from the group consisting of hydrogen, an alkyl group and an alkali forming metal and R, $R_1$, $R_2$, $R_3$, X and n have the meaning previously assigned to them have been found to be particularly advantageous, especially for the coloration of cellulose acetate.

Both sulfonated and non-sulfonated compounds are included within the scope of our invention. The nuclear non-sulfonated compounds have been found to be especially of value for the dyeing of organic derivatives of cellulose and it is to these compounds and their application for the dyeing of organic derivative of cellulose textile materials that our invention is particularly directed. These nuclear non-sulfonated compounds likewise possess some application for the dyeing of wool and silk. For the dyeing of organic derivatives of cellulose such as cellulose acetate silk, nuclear non-sulfonated dye compounds wherein A is a benzene nucleus are generally advantageous. Preferably when the dye compounds of our invention are to be employed for the dyeing of organic derivatives of cellulose, they should contain no nuclear free carboxylic acid group.

The nuclear sulfonated compounds of our invention have little or no utility for the dyeing of organic derivatives of cellulose but possess application for the dyeing of wool and silk. These compounds can be prepared by sulfonation of the unsulfonated dye compounds in known fashion or by the use of sulfonated components. Rubine, yellow, orange-yellow, orange, wine and violet shades, for example, can be obtained employing the dye compound of our invention.

It is an object of our invention to provide a new class of azo dye compounds suitable for the coloration of organic derivatives of cellulose, wool and silk. Another object of our invention is to provide a process for the coloration of organic derivatives of cellulose, wool and silk. A further object is to provide colored textile materials which are of good fastness to light and washing. A particular object of our invention is to provide a new class of nuclear non-sulfonated azo dyes suitable for the coloration of cellulose acetate silk. Other objects will hereinafter appear.

The azo dye compounds of our invention can be prepared by diazotizing diazotizable members selected from the group consisting of an arylamine of the benzene series, an aminonaphthalene, an aminobenzothiazole and an aminobenzoxazole and coupling the diazonium compounds obtained with benzene coupling compounds containing a

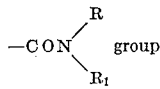

group wherein R and R₁ each represents a member selected from the group consisting of hydrogen, an alkyl group, an allyl group, a cycloalkyl group, a phenyl group and a furyl group and wherein

together may be morpholine, attached to the benzene nucleus in ortho or meta position to a

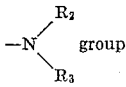

group wherein R₂ and R₃ each represents a member selected from the group consisting of an alkyl group, an aryl group, a cycloalkyl group, a phenyl group and a furyl group, and R₂ may be in addition hydrogen.

It will be understood that the term "alkyl," as used herein, includes unsubstituted alkyl groups such as a methyl group, an ethyl group, a propyl group or a butyl group as well as substituted alkyl groups such as β-hydroxyethyl, β-hydroxypropyl, β,γ-dihydroxypropyl, γ-hydroxypropyl, β-methoxyethyl, β-ethoxyethyl, β-sulfoethyl, γ-sulfopropyl, β-sulfatoethyl, β-phosphatoethyl, γ-phosphatopropyl and the alkyl esters of the hydroxyalkyl groups named, for example. Illustrative cycloalkyl groups include cyclobutyl, cyclohexyl and cycloheptyl. Similarly, illustrative of furyl may be mentioned a furyl radical such as furfuryl, tetrahydrofurfuryl, 5-ethylfurfuryl, 5-ethyltetrahydrofurfuryl and 5-β-hydroxyethyltetrahydrofurfuryl. Again, it will be understood that the expression "a phenyl group" includes not only phenyl groups but phenyl groups substituted, for example, with a halogen atom such as chlorine and bromine, an alkyl group, a hydroxy group, an alkoxy group, a nitro group and a cyano group.

The term "a sulfoamide group" includes the sulfonamide group as well as substituted sulfonamide groups such as alkylsulfonamide and phenylsulfonamide. Alkali-forming metals include, for example, sodium, potassium, calcium, barium and ammonium.

The following examples illustrate the preparation of the azo dye compounds of our invention:

*Example 1*

12.8 grams of o-chloroaniline are dissolved in 150 cc. of water to which has been added 25 grams of 36% hydrochloric acid. The resulting solution is cooled to a temperature approximating 0–5° C. and the amine is diazotized, while maintaining a temperature of 0–20° C., by the addition, with stirring, of a concentrated aqueous solution of 6.9 grams of sodium nitrite.

12.7 grams of m-methylaminobenzamide,

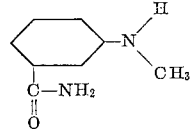

are dissolved in a dilute hydrochloric acid solution. The resulting solution is cooled to a temperature approximating 0–10° C. and the diazo solution prepared as described above is added with stirring. After addition of the diazo solution the mixture is allowed to stand for a short time after which it is made neutral to Congo red paper by the addition of an alkaline agent such as sodium acetate or sodium carbonate. Upon completion of the coupling reaction which takes place, the dye compound formed is recovered by filtration, washed with water and dried. The dye compound obtained colors cellulose acetate silk, wool and silk yellow.

*Example 2*

13.8 grams of p-nitroaniline are diazotized in known fashion and the diazonium compound obtained is coupled with 21.7 grams of m-di-β-hydroxyethylaminobenzamide. Coupling can be carried out in a cold dilute sulfuric acid solution. The dye compound obtained colors cellulose acetate silk, wool and silk rubine.

Equivalent gram molecular weights of m-di-β-hydroxyethylamino allylbenzamide and m-methylethylamino furfurylbenzamide can be substituted for the coupling component of the example to obtain dye compounds which color cellulose acetate silk, wool and silk rubine.

*Example 3*

15.6 grams of 1-amino-2-fluoro-4-nitrobenzene are diazotized in known fashion and the diazonium compound obtained is coupled in a cold dilute sulfuric acid medium with 20.8 grams of m-γ-hydroxypropylamino methylbenzamide. The dye compound obtained colors cellulose acetate silk rubine.

Example 4

17.2 grams of 1-amino-2-chloro-4-nitrobenzene are diazotized and the diazonium compound obtained is coupled in a cold dilute sulfuric acid solution with 23.8 grams of m-glycerylamino dimethylbenzamide. The dye compound obtained colors cellulose acetate silk, wool and silk rubine.

An equivalent gram molecular weight of m-β-hydroxyethylamino cyclohexylbenzamide can be substituted for the coupling component of the example to obtain a dye which colors cellulose acetate silk, wool and silk rubine.

Example 5

21.7 grams of 1-amino-2-bromo-4-nitrobenzene are diazotized and the diazonium compound obtained is coupled in a cold dilute hydrochloric acid solution with 30.8 grams of m-ethyl-butylamino di-β-hydroxyethylbenzamide. The dye compound obtained colors cellulose acetate silk, wool and silk rubine.

By the substitution of an equivalent gram molecular weight of m-allylamino di-β-hydroxyethylbenzamide or m-tetrahydro furfurylamino ethylbenzamide, for example, for the coupling component of the example, dye compounds are obtained which yield rubine shades on cellulose acetate silk, wool and silk.

Example 6

18.8 grams of 5-nitro-2-aminophenylmethylsulfone are diazotized and the diazonium compound obtained is coupled with 58 grams of

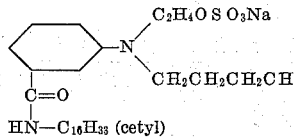

The dye compound obtained colors cellulose acetate silk violet.

Example 7

18 grams of 6-methoxy-2-aminobenzothiazole are diazotized in known fashion and the diazonium compound obtained is coupled with 22.4 grams of m-ethyl-β-hydroxyethylaminobenzamide. The dye compound obtained colors cellulose acetate silk a rubine shade.

Example 8

18.6 grams of 5-nitro-2-aminobenzene sulfonic acid are diazotized and the diazonium compound obtained is coupled in a cold dilute hydrochloric acid solution with 41.4 grams of

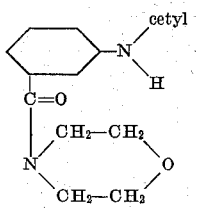

The dye compound obtained colors silk and wool rubine.

Example 9

30.2 grams of p-nitrobenzeneazo-2,5-dimethoxyaniline are diazotized in accordance with the method described in Example 1 and the diazonium compound obtained is coupled in a cold dilute hydrochloric acid medium with 27.2 grams of m-β-methoxyethyl - β - ethoxyethylaminobenzamide. The dye compound obtained colors cellulose acetate silk violet.

Example 10

.1 gram mole of 2-amino-3,5-dinitrobenzene sulfonethylamide is diazotized and the diazonium compound obtained is coupled with .1 gram mole of

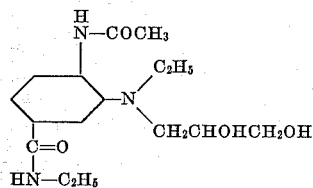

Coupling is conducted in an acetic acid solution and water is added to effect precipitation of the dye compound. The dye compound obtained colors cellulose acetate silk reddish-blue.

Example 11

.1 gram of 1-amino-2,4-dinitro-6-chlorobenzene is diazotized and the diazonium compound obtained is coupled with .1 gram mole of

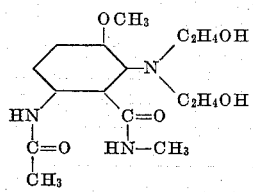

The dye compound obtained colors cellulose acetate silk violet.

Example 12

.1 gram mole of p-aminophenylmethylsulfone is diazotized and the diazonium compound obtained is coupled with .1 gram mole of

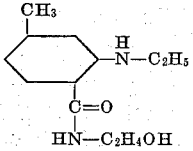

The dye compound obtained colors cellulose acetate silk orange.

.1 gram mole of

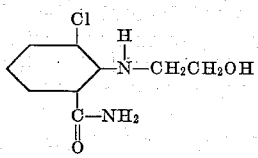

and

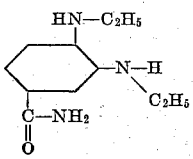

can be substituted for the coupling component of the example to obtain dyes which color cellulose acetate silk orange.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 12, inclusive.

| Amine | Coupling component | Color |
|---|---|---|
| o-(F, Cl, Br, I)-aniline | (1) m-Ethylaminobenzamide | Yellow. |
| | (2) m-β-hydroxyethylaminobenzamide | Do. |
| | (3) m-Glycerylaminobenzamide | Do. |
| | (4) m-Ethyl-β-hydroxyethyl-aminobenzamide. | Do. |
| | (5) m-Ethylglycerylaminobenzamide | Do. |
| | (6) m-Ethyl-γ-hydroxypropyl-aminobenzamide. | Do. |
| | (7) m-Ethylbutylaminobenzamide | Do. |
| | (8) m-Dimethylaminobenzamide | Do. |
| | (9) m-P-hydroxycyclohexylamino methylbenzamide. | Do. |
| | (10) m-γ-Chloro-β-hydroxypropylamino dimethylbenzamide. | Do. |
| | (11) m-Phenylaminobenzamide | Do. |
| | (12) m-Sodiumsulfoethylbutylamino phenylbenzamide. | Do. |
| 1-amino-2-methyl-5-chlorobenzene | Coupling components 1-12 | Orange-yellow. |
| 1-amino-2-methoxy-5-chlorobenzene | do | Orange. |
| 1-amino-2-nitro-4-methylbenzene | do | Do. |
| p-Aminoacetophenone | do | Rubine. |
| p-Nitroaniline | do | Do. |
| 1-amino-2-methyl-4-nitrobenzene | do | Do. |
| 1-amino-2-ethoxy-4-nitrobenzene | do | Do. |
| 1-amino-2-chloro-4-nitrobenzene | do | Do. |
| 2,4-dinitroaniline | do | Wine. |
| 2,4-dinitro-6-(Cl, Br, F, I)-aniline | do | Violet. |
| 5-nitro-2-aminophenyl-methylsulfone | do | Do. |
| 2,4-dinitro-α-naphthylamine | do | Do. |
| 1-amino-2-hydroxy-4-nitrobenzene | do | Rubine. |
| 2-amino-6-methoxybenzothiazole | do | Do. |
| 2-amino-6-methoxy-benzoxazole | do | Do. |
| p-Nitrobenzeneazo-2,5-dimethoxyaniline | do | Violet. |
| α-naphthylamine | do | Orange. |
| 1-amino-2,6-dinitro-4-chlorobenzene | do | Violet. |

While the application of the compounds of our invention has been described more particularly in connection with the colors they yield on cellulose acetate silk, it will be understood that they can be employed for the coloration of other organic derivatives of cellulose such as those hereinbefore named and that they yield similar colorations on these materials. Dye compounds of particular utility for the coloration of wool and silk can be prepared by diazotizing sulfonated arylamines and coupling the diazonium compounds obtained with any of the coupling components shown herein. Sulfonated amines which can be employed include, for example, p-sulfanilic acid, 1-amino-4-sulfonic naphthalene, 2-naphthylamine-8-sulfonic acid, 1-naphthylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, 1-amino-5-naphthyl-7-sulfonic acid, metanilic acid, 1-amino-2-sulfonic-4-nitrobenzene, 1-amino-2,4-disulfonic benzene and 1-amino-2-chloro-4-sulfonic benzene.

In order that our invention may be completely understood, the preparation of the coupling components employed in the manufacture of the dye compounds of our invention is indicated hereinafter. m-Nitrobenzamide and o-nitrobenzamide can be prepared by reacting m-nitrobenzoyl chloride and o-nitrobenzoyl chloride, respectively, with ammonia. Similarly m- and o-nitrobenzamides substituted in the carboxamide group can be obtained by reacting meta- and ortho-nitrobenzoyl chloride with amines such as methylamine, di-β-hydroxyethylamine, propylamine, butylamine, furfurylamine, cyclohexylamine, allylamine and aniline. The nitrobenzamide compounds thus obtained can be converted to the corresponding aminobenzamide compounds in the presence of a nickel, copper or copper chromite catalyst.

The free amino group of the aminobenzamide compounds can be alklated by heating in an autoclave with an organic oxide such as ethylene oxide, propylene oxide, trimethylene oxide, glycidol, epichlorohydrin and

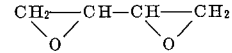

Similarly the amino group can be substituted by reaction with an alkyl halide, allyl chloride, an alkyl sulfate, p-toluene sulfonates and p-nitro-o-chlorobenzene.

Coupling compounds wherein

is morpholine can be prepared by reacting meta and ortho-nitrobenzoyl chloride with morpholine and then proceeding as described hereinbefore.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula:

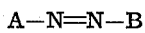

wherein A represents the residue of an aryl nucleus of the benzene series, B represents the residue of a benzene coupling component having but one benzene ring and containing a

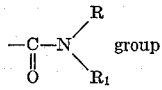

wherein R and $R_1$ each represents a member selected from the group consisting of hydrogen, an alkyl group, an allyl group, a cycloalkyl group, a phenyl group, and a furyl group and wherein

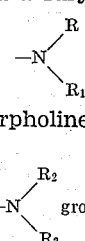

together may be morpholine, in ortho position to the azo bond and a

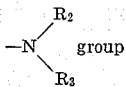

wherein $R_2$ and $R_3$ each represents a member selected from the group consisting of an alkyl group, an allyl group, a cycloalkyl group, a phenyl group and a furyl group and $R_2$ may be in addition hydrogen, in para position to the azo bond.

2. The azo dye compounds having the general formula:

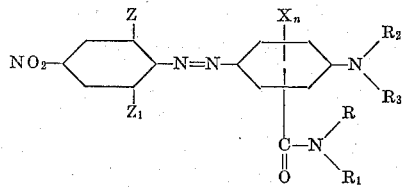

wherein R and $R_1$ each represents a member selected from the group consisting of hydrogen, an alkyl, an allyl, a cycloalkyl, a phenyl and a furyl group and wherein

together may be morpholine, $R_2$ and $R_3$ each represents a member selected from the group consisting of an alkyl, an allyl, a cycloalkyl, a phenyl, and a furyl group and $R_2$ may be, in addition, hydrogen, X represents a member selected from the group consisting of hydrogen, a halogen atom, an alkoxy, an alkyl and an amino group, $n$ represents 1 and 2 and Z and $Z_2$ each represents a member selected from the group consisting of hydrogen, a halogen atom, a nitro, an alkylsulfone, a sulfonamide, a hydroxy, an alkoxy, an alkyl, a cyano, an alkylketone and a —COOY group wherein Y represents a member selected from the group consisting of hydrogen, an alkyl group and an alkali-forming metal.

3. The azo compound having the formula:

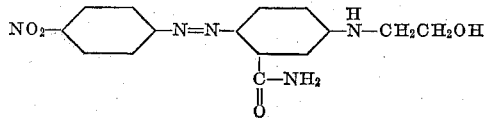

4. The azo compound having the formula:

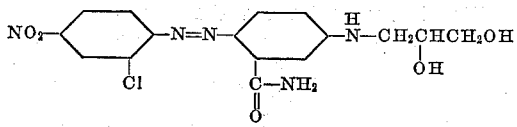

5. The azo compound having the formula:

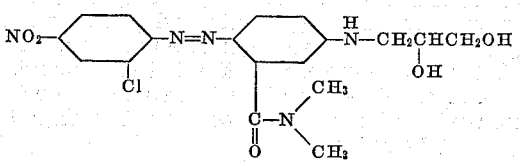

6. Textile material colored with an azo dye compound having the general formula:

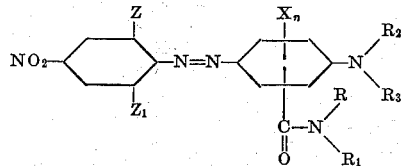

wherein R and $R_1$ each represents a member selected from the group consisting of hydrogen, an alkyl, an allyl, a cycloalkyl, a phenyl and a furyl group and wherein

together may be morpholine, $R_2$ and $R_3$ each represents a member selected from the group consisting of an alkyl, an allyl, a cycloalkyl, a phenyl, and a furyl group and $R_2$ may be, in addition, hydrogen, X represents a member selected from the group consisting of hydrogen, a halogen atom, an alkoxy, an alkyl and an amino group, $n$ represents 1 and 2 and Z and $Z_1$ each represents a member selected from the group consisting of hydrogen, a halogen atom, a nitro, an alkylsulfone, a sulfonamide, a hydroxy, an alkoxy, an alkyl, a cyano an alkylketone and a —COOY group wherein Y represents a member selected from the group consisting of hydrogen, an alkyl group and an alkali-forming metal.

7. A cellulose acetate colored with a nuclear non-sulfonated azo dye compound having the general formula:

A—N=N—B wherein A—N=N— represents the residue of a member selected from the group consisting of a diazotized aminobenzene, a diazotized aminonaphthalene, a diazotized aminobenzothiazole and a diazotized aminobenzoxazole, B represents the residue of a benzene nucleus having but one benzene ring and containing a

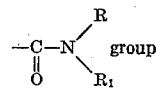

wherein R and $R_1$ each represents a member selected from the group consisting of hydrogen, an alkyl group, an allyl group, a cycloalkyl group, a phenyl group, and a furyl group and wherein

together may be morpholine, in ortho or meta position to the azo bond and a

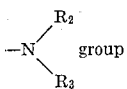

group wherein $R_2$ and $R_3$ each represents a member selected from the group consisting of an alkyl group, an allyl group, a cycloalkyl group, a phenyl group and a furyl group and $R_2$ may be in addition hydrogen in para position to the azo bond.

8. A cellulose acetate colored with a nuclear non-sulfonated azo dye compound having the general formula:

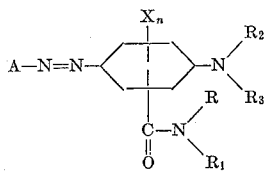

wherein A—N=N— represents the residue of a member selected from the group consisting of a diazotized aminobenzene, a diazotized aminonaphthalene, a diazotized aminobenzothiazole and a diazotized aminobenzoxazole, R and $R_1$ each represents a member selected from the group consisting of hydrogen, an alkyl group, an allyl group, a cycloalkyl group, a phenyl group, and a furyl group and wherein

together may be morpholine, $R_2$ and $R_3$ each represents a member selected from the group consisting of an alkyl group, an allyl group, a cycloalkyl group, a phenyl group and a furyl group, and $R_2$ may be in addition hydrogen, X represents a member selected from the group consisting of hydrogen, a halogen atom, an alkoxy group, an alkyl group and an amino group and $n$ represents 1 or 2.

9. A cellulose acetate colored with a nuclear non-sulfonated azo dye compound having the general formula:

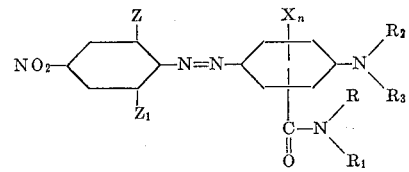

wherein R and $R_1$ each represents a member selected from the group ocnsisting of hydrogen, an alkyl, an allyl, a cycloalkyl, a phenyl and a furyl group and wherein

together may be morpholine, $R_2$ and $R_3$ each represents a member selected from the group consisting of an alkyl, an allyl, a cycloalkyl, a phenyl, and a furyl group and $R_2$ may be, in adtion, hydrogen, X represents a member selected from the group consisting of hydrogen, a halogen atom, an alkoxy, an alkyl and an amino group, $n$ represents 1 and 2 and Z and $Z_1$ each represents a member selected from the group consisting of hydrogen, a halogen atom, a nitro, an alkylsulfone, a sulfonamide, a hydroxy, an alkoxy, an alkyl, a cyano, an alkylketone and a —COOY group wherein Y represents a member selected from the group consisting of hydrogen, an alkyl group and an alkali-forming metal.

JOSEPH B. DICKEY.
JAMES G. McNALLY.